United States Patent [19]

Vinton et al.

[11] 4,022,875

[45] *May 10, 1977

[54] METHOD FOR THE PREPARATION OF VITREOUS CARBON FOAMS

[75] Inventors: Clarence S. Vinton; Charles H. Franklin, both of Ann Arbor, Mich.

[73] Assignee: Chemotronics International, Inc., Ann Arbor, Mich.

[ * ] Notice: The portion of the term of this patent subsequent to Dec. 16, 1992, has been disclaimed.

[22] Filed: Nov. 24, 1975

[21] Appl. No.: 634,615

[52] U.S. Cl. .............................. 423/445; 264/29.1; 264/29.6; 423/448; 423/449

[51] Int. Cl.² .................... C01B 31/00; C01B 31/02

[58] Field of Search .................. 423/445, 448, 449; 264/29; 427/228, 244

[56] References Cited

UNITED STATES PATENTS

| | | | |
|---|---|---|---|
| 3,111,396 | 11/1963 | Ball | 423/449 |
| 3,121,050 | 2/1964 | Ford | 264/29 |
| 3,302,999 | 2/1967 | Mitchell | 423/448 |
| 3,345,440 | 10/1967 | Googin et al. | 264/29 |
| 3,387,940 | 6/1968 | McHenry et al. | 264/29 |
| 3,446,593 | 5/1969 | Moutaud | 423/448 |
| 3,531,248 | 9/1970 | Sheinberg | 264/29 |
| 3,574,548 | 4/1971 | Sands et al. | 264/29 |
| 3,778,336 | 12/1973 | Adams | 264/29 |
| 3,857,913 | 12/1974 | Crow et al. | 264/29 |
| 3,927,186 | 12/1975 | Vinton et al. | 423/445 |

FOREIGN PATENTS OR APPLICATIONS 660,107   3/1903   Canada ............................. 427/228

Primary Examiner—Earl C. Thomas
Assistant Examiner—Eugene T. Wheeler
Attorney, Agent, or Firm—Ian C. McLeod

[57] ABSTRACT

A rapid method for forming vitreous carbon foams from flexible polyurethane foams having membranes dividing contiguous cells, which faithfully reproduces the geometry of the uncarbonized polyurethane foams, by infusing the polyurethane foams with substantially unresinified or unpolymerized furfuryl alcohol which is capable of resinification at temperatures above room temperature is described. An important step in the method which permits rapid carbonization without cracking and which is essential to faithful foam geometry reproduction is the substantial removal of the liquid non-infused furfuryl alcohol from the polyurethane foam surfaces after the infusion or swelling step. The carbonized foam is in the form of vitreous, disordered or glassy carbon and is particularly useful for corrosive and/or high temperature applications such as insulation, corrosion resistant chemical processing components and the like.

5 Claims, 5 Drawing Figures

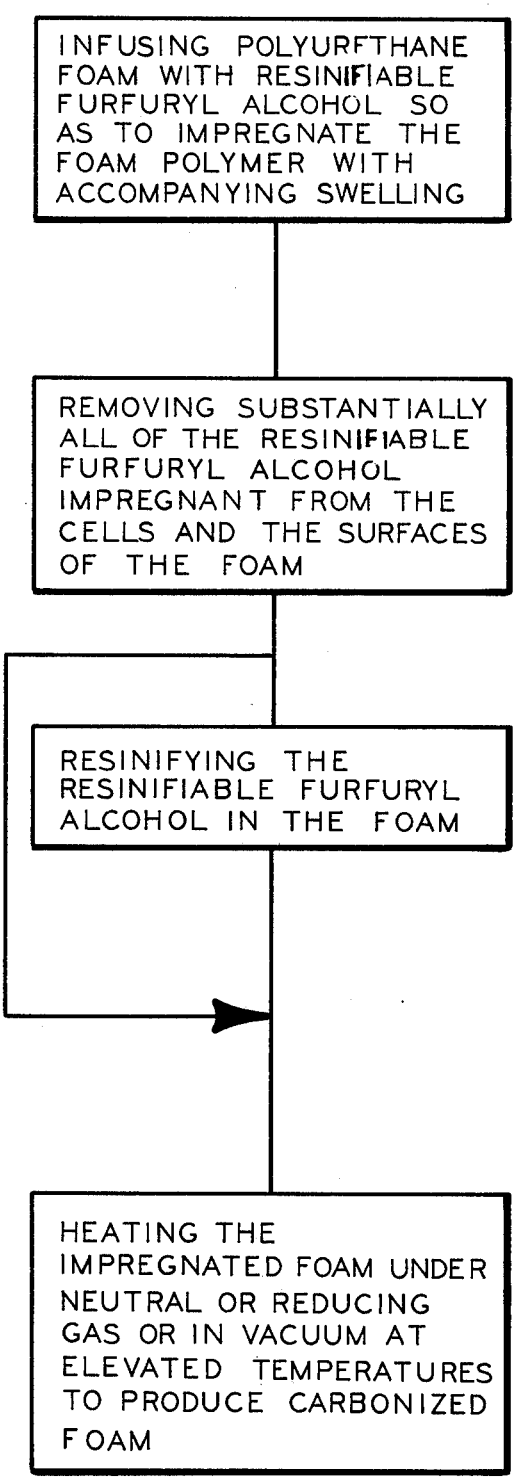
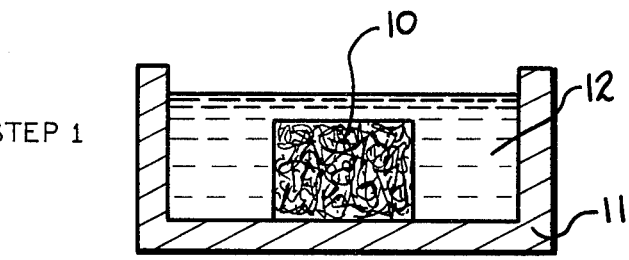
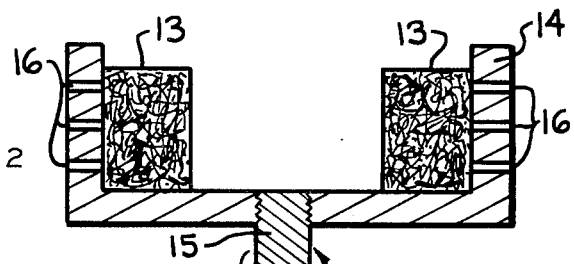
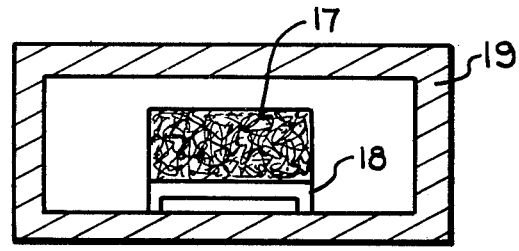
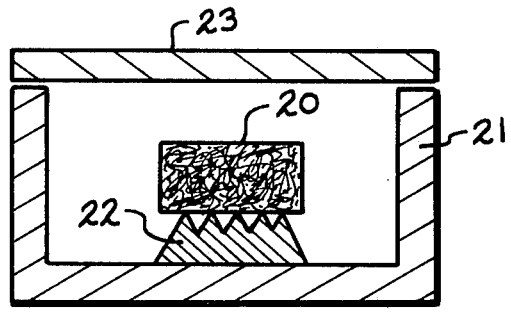

METHOD FOR THE PREPARATION OF VITREOUS CARBON FOAMS

BACKGROUND OF THE INVENTION

The present invention relates to a method for forming novel carbon foams which faithfully reproduce the geometry of precursor unreticulated polyurethane foams. More particularly a method for forming strong, crack-free, vitreous carbon foams is described.

The prior art has described carbon structures prepared from carbon particles mixed with liquid thermosetting furan resins which are shaped under pressure in a mold and then carbonized as the unsupported shape outside of the mold. Illustrative are the carbon structures shown in U.S. Pat. No. 3,089,195 which describes carbonization by slow temperature increases of about 100° F (55° C) per hour up to 1000° F (538° C) to prevent cracking.

A method described for producing carbon structures (bulk density 0.02 to 0.8 gm/cc) in the prior art involves the foaming of polyurethane resins in admixture with liquid furan resin precursors and subsequent unsupported carbonization of the combination. Carbon or other elements or compounds may also be incorporated. Illustrative are U.S. Pat. Nos. 3,345,440; 3,574,548 and 3,635,676 wherein the carbonization is achieved in a minimum of 36 hours. As stated in U.S. Pat. No. 3,574,548, slow heating was used to avoid spontaneous cracking.

Another prior art method for producing carbon structures is described in U.S. Pat. No. 3,446,593 wherein it is stated that a viscous liquid furan resin is impregnated into a polyurethane foam having a density of 0.25 grams per cubic centimeter, and then some of the viscous liquid resin may be drained out. The resulting structure is left to rest, so that the furan resin is hardened, for 4 to 8 days. The cured foam-furan resin structure is described as having a weight which is 10 times that of the foam alone. The product is then carbonized in the unsupported form at an average heating speed of 5° to 10° C per hour up to 1200° C. Thus the combined procedure takes about 9 or more days including about 5 days of closely regulated heating. The reason for the long, closely regulated heating time is to attempt to prevent the structures from spontaneously cracking during carbonization. The carbon structures are decribed as having a density of the order of 0.1 and 0.4 gm/cc. The carbon structure described does not faithfully reproduce the geometry of the polyurethane foam because of the excess amount of undrained cured furan resin trapped in the foam cells and remaining on the foam surfaces.

In our applications Ser. Nos. 336,636 and 489,409, a process is described for producing reticulated carbon structures from reticulated flexible polyurethane structures infused with a furan resin or catalyzed furfuryl alcohol. The reticulated polyurethane structures are derived from polyurethane foams by the removal of the cell membranes which divide contiguous cells. In these patent applications, it was shown that excess furan resin on the surfaces of the strands caused cracking upon rapid heating to produce carbonization. The unreticulated polyurethane foams were not used in applicants' process because the cell membranes prevented the removal of the excess viscous furan resin throughout the foam volume, especially in the interior portions of the foam, when attempts were made to make commercially practical sizes of vitreous carbon blocks. The membranes act as barriers between the individual cells of the foam. Since unreticulated polyurethane foams are less expensive than reticulated polyurethane structures, a method was sought to produce carbon foams from them with good reproducibility and which avoids the limitations imposed by viscous resins.

It is therefore an object of the present invention to produce crack-free vitreous carbon foams by a method which requires only a few hours to produce them. Further it is an object of the present invention to provide a method which is simple and economic, particularly because of the elimination of the need for precise temperature change regulation and because of the rapid carbonization times. Further, it is an object of the present invention to produce strong, crack-free, carbon foams which faithfully reproduce the form of a polyurethane foam parent material. These and other objects will become increasingly apparent by reference to the following description and the drawing.

IN THE DRAWING

FIG. 1 schematically illustrates in Steps 1 to 4 the preferred method of the present invention.

FIG. 2 illustrates Step 1. FIG. 3 particularly illustrates a mechanical means for the removal of substantially all of the catalyzed and substantially unresinified furfuryl alcohol from the surfaces of the polyurethane foam. As shown in FIG. 4 and Step 3, the furfuryl alcohol is resinified within the strands and membranes of the polyurethane foam thereby forming a rigid structure. As can be seen, Step 3 as shown in FIG. 4 can be by-passed and the wet infused foam can be fired directly as shown in FIG. 5.

DESCRIPTION OF THE INVENTION

The present invention relates to a method for forming vitreous carbon foams which comprises; infusing flexible polyurethane foams with substantially unresinified but resinifiable furfuryl alcohol so as to cause the foams to swell by infusion of the furfuryl alcohol into the polymer comprising the foams removing substantially all of the non-infused furfuryl alcohol from within the cells and from the surfaces of the infused foams, resinifying the furfuryl alcohol in the foams to form a thermoset resin, and carbonizing the infused foams under vacuum, neutral, non-oxidizing or reducing conditions thereby allowing crack-free carbonization to be achieved in less than about five hours at a rate of temperature change which causes cracking of the foam when substantial resinified furfuryl alcohol remains on the surfaces. Carbonization of the infused foam is generally considered to begin at about 250° to 350° C. This method allows faithful reproduction of the original foam geometry. Carbonization can also be achieved without a specific intermediate resinification step. Further, the present invention relates to crack-free carbon foams which are derived from and which geometrically reproduce upon carbonization the identical form of unreticulated polyurethane foams which prior to carbonization had been infused with substantially unresinified but resinifiable furfuryl alcohol such that the infused foams are substantially free of internal and external surface coatings of furfuryl alcohol and have weights of the polyurethane foams and resinified furfuryl alcohol of up to about six times that of the polyurethane foams alone.

Unexpectedly, it has been found that by swelling a flexible polyurethane foam by infusing it with substantially unresinified but curable or polymerizable furfuryl alcohol and then removing substantially all of the furfuryl alcohol from the surfaces of the infused foam prior to carbonization, that cracking does not occur upon subsequent rapid carbonization. The carbonization can be very rapidly completed in less than about five hours. The infused foam before or after resinification can be placed in a cold oven and heated. If the foam is impregnated with partially resinified furfuryl alcohol and/or furan resin, the mixture is usually too viscous for satisfactory introduction or removal from the foam. This is in distinct contrast to the reticulate structures described in our above referenced applications.

It has been found as a result of the substantial removal of the furfuryl alcohol from the foam surfaces after infusion of the furfuryl alcohol within the polyurethane foam solid polymer portions that there is no need to allow several days for thermosetting of the liquid furan resin as indicated to be necessary by U.S. Pat. No. 3,446,593. Using low temperature heating, the thermosetting of the resinifiable furfuryl alcohol can be accomplished in a few hours to form a hard, rigid product exhibiting the characteristics of a homogeneous alloyed material which is then ready for rapid carbonization. Alternatively, the infused but non-theremoset foam can be fired directly from room temperature to achieve carbonization.

The flexible polyurethane foams are well known to those skilled in the art and include polyether and polyester polyurethane foams, particularly those derived from toluene diisocyanate. The flexibility and resiliency of the polyurethane foams allows the easy removal of the liquid furfuryl alcohol from the cellular foam surfaces and from within the cells by draining, centrifugation, squeezing or other mechanical techniques.

The production of flexible polyurethane foams, particularly cellular materials of various types, is well understood in the polymer art and is described for example in "German Plastics and Practice" published by DeBell and Richardson, 1946, Chapter 21, "Plastic Foams", pages 462-465; "Papers Presented at the Atlantic City Meeting: Synthesis of Isocyanate Polymers" published by the American Chemical Society, Division of Paints, Plastics and Printing Ink Chemistry, September, 1956; and in the patent literature and more recent publications.

Furfuryl alcohol can be inhibited with alkaline materials to prevent resinification and such inhibited furfuryl alcohol mixtures are not suitable for the practice of this invention without neutralization or other manipulation to overcome the effect of the inhibitor.

The resinifiable furfuryl alcohol is provided in situ in the flexible polyurethane foam strands and membranes. This can be accomplished because furfuryl alcohol has a low viscosity. The polyurethane foam polymer is penetrated by and swells in contact with the resinifiable furfuryl alcohol to form a gel-like structure. After removal of unabsorbed furfuryl alcohol, the remaining infused furfuryl alcohol can then be resinified or cured to a solid furan resin within the strands and membranes of the polyurethane foam. The furfuryl alcohol is used alone or in admixture with other compatible non-viscous solvents. The furfuryl alcohol can be catalyzed by mineral or organic acids or acid-forming salts which act rapidly at elevated temperatures to form the thermoset furan resin but which are usually chosen to act relatively slowly at room temperatures. Suitable catalysts are, for example, oxalic acid and citric acid. The means by which the furfuryl alcohol is catalyzed, whether by contact of the catalyst with the furfuryl alcohol within or external to the polyurethane foam, is immaterial. The contact can be in the form of a vapor, liquid or solid. Furan resin systems are described generally in *Polymers and Resins*, Brage Golding, pages 366 to 373 (D. Van Nostrand Company, Inc. 1959).

The preferred method of the present invention is illustrated in FIGS. 1 to 5. In Step 1 as shown in FIG. 2, the flexible polyurethane foam 10, preferably is provided in a container 11 and immersed in essentially unresinified but resinifiable furfuryl alcohol 12. The swelling of the polyurethane foam is thus accomplished.

In Step 2, as shown in FIG. 3, the swollen foam 13 is treated so as to remove substantially all of the furfuryl alcohol 12 from the infused foam cells and surfaces, such as by centrifugation by a drum 14 rotated on axis 15 and with peripheral holes 16 for furfuryl alcohol removal. Gentle pressing (not shown) of the swollen flexible polyurethane foam on an absorbent material can also be used particularly with small size samples. In any event, substantially all of the furfuryl alcohol 12 is removed from the surfaces of the infused foam 13.

In Step 3, as shown in FIG. 4, the treated foam 17 is cured on a rack 18 which is provided in an oven 19 by heating to thermoset the resinifiable furfuryl alcohol in the foam 13. As shown in FIG. 1, this step can be bypassed and the wet infused structure can be fired directly. The thermosetting of the furfuryl alcohol to the furan resin is accomplished at temperatures preferably between about 50° and 200° C. The cured furan resin and polyurethane foam will have a weight up to about 6 times that of the foam alone.

In Step 4, as shown in FIG. 5, the vitreous carbon foam 20 is produced by carbonizing the thermoset furan resin and polyurethane foam combination 17 in a neutral or reducing atmosphere or in a vacuum at elevated temperatures. In one method the impregnated foam 17 is placed in a container 21 on a support 22 with a loose fitting cover 23 and carbonized. The pyrolysis products of the infused foam function to eliminate oxygen and to maintain reducing or neutral conditions during carbonization. However, other gaseous neutral or inert atmospheres such as nitrogen or argon or gaseous reducing agents or reducing gaseous atmospheres such as hydrogen, or a vacuum, can be provided in the container 21 with sealing by the cover 23 to prevent the oxidation of the carbon foam 20 by excluding reaction with oxidizing gases during carbonization and during cooling.

The form of carbon foam produced is termed "glassy" or "vitreous" carbon which is generally characterized as disordered carbon, as is well defined in the literature, and is obtained by firing at about 500° C or higher. Firing can go to about 3000° C or even higher, but it is unnecessary for many applications. Commercially produced vitreous carbon products are generally fired to at least 1000° C. The carbonized foam products produced, regardless of the temperature of carbonization, are crack-free and remain resistant to cracking due to rapid temperature changes. Conditions of carbonization to produce vitreous carbon are well known in the art and the present invention uses the same ultimate temperatures of carbonization as prior art methods, but differs in that the time required to reach these carbonization temperatures is very greatly reduced by the present method. The vitreous carbon foams produced generally have a bulk density of between 1 and 3 times the precursor polyurethane foam bulk density. Bulk density is the volume as determined by the outside dimensions of the sample divided into the weight of the sample.

Having generally described the method and products of the present invention, the following is a specific Example.

EXAMPLE I

The following example illustrates the unexpected ability to produce the vitreous carbon foam by using a furnace to very rapidly raise the uncarbonized structure to carbonization temperatures.

Thirty-seven kg of furfuryl alcohol were mixed with 1.85 kg of oxalic acid at room temperature so that there would be no noticeable resinification before infusion. A sample of a polyether polyurethane foam having approximately 23 to 32 pores per centimeter and a bulk density of 0.023 gm/cc was soaked in the above catalyzed furfuryl alcohol at room temperature for 90 minutes. The catalyzed furfuryl alcohol remaining on the foam surfaces and within the cells was then removed by atmospheric pressing using a vacuum box. The box contained a fixed screen halfway between top and bottom upon which the infused sample was placed, covered by a flexible plastic film and a vacuum source connected to the box underneath the screen. The sample was thus pressed by air pressure on the film to remove the excess furfuryl alcohol. The catalyzed furfuryl alcohol was then resinified and cured in the foam strands and membranes in an oven at 100° C for 4 hours. The sample was then placed in a covered retort in a furnace and the sample was blanketed with nitrogen gas. The furnace, which was at room temperature of about 20° C, was heated to 960° C over a period of (4½) hours, and then the retort was removed and allowed to cool with the sample in it. The following is the data on the sample:

| | |
|---|---|
| Starting weight | 130 grams |
| Starting dimensions | 10.2 cm × 20.3 cm × 27.9 cm |
| Infused weight | 745 grams |
| Cured weight | 505 grams |
| Cured dimension | 14.0 cm × 27.9 cm × 37.5 cm |
| Final weight | 210 grams |
| Final dimension (approx.) | 8.9 cm × 19.7 cm × 26.7 cm (untrimmed) |
| Final bulk density | 0.046 gm/cc as determined on the trimmed piece |
| Final condition | crack-free and vitrified |

EXAMPLE II

The procedure of Example I was repeated except that the infused polyurethane foam was not resinified and cured prior to the carbonization step, but rather fired directly as the wet structure. The results were the same as Example I except that the bulk density of the trimmed piece was 0.058 gm/cc.

The following example illustrates the ability of uncatalyzed but resinifiable furfuryl alcohol to be infused into a polyester polyurethane foam which contains a catalyst for the furfuryl alcohol within the foam polymer, thus allowing the infused foam to be resinified and subsequently carbonized. An equivalent result would be achieved if a furfuryl alcohol catalyst were incorporated in the polyurethane foam during its manufacture for activation subsequently by infusing the foam with furfuryl alcohol.

EXAMPLE III

One-half gram of paratoluenesulfonic acid, a catalyst for furfuryl alcohol, was dissolved in 100 grams of acetone at room temperature. A sample of unreticulated polyester polyurethane foam having about 32 pores per centimeter was then immersed in this acetone solution for 1 minute, after which it was removed, squeezed against an absorbent material, air dired for 1 hour followed by oven drying in air at 100° C for 40 minutes. The catalyst infused sample was then immersed in uncatalyzed but resinifiable (uninhibited) furfuryl alcohol for one minute at room temperature, after which it was removed from the bath, the excess furfuryl alcohol was then removed by squeezing against an absorbent material and the sample was placed in an air oven at 100° C for 18 hours (overnight), which resinified the furfuryl alcohol and rigidified the sample, after which it was placed in a covered steel retort and then carbonized in an oven which was at room temperature when the sample was placed in it and then was heated to 1000° C in 2 hours, whereupon it was removed from the furnace, cooled and examined. The pyrolysis products produced an atmosphere which substantially prevented oxidation of the sample. The results were the same as Examples I and II. The following is the data on the sample:

| | |
|---|---|
| Starting weight | 3.86 gms |
| Starting dimensions | 5.1 cm × 5.2 cm × 5.2 cm |
| Wet Infused weight (catalyst infusion) | 7.8 gms |
| Wet Infused dimensions (catalyst infusion) | 5.8 cm × 5.8 cm × 6.0 cm |
| Dried weight (catalyst infusion) | 3.88 gms |
| Dried dimensions (catalyst infusion) | 4.3 cm × 5.1 cm × 5.1 cm |
| Wet unresinified dimensions (furfuryl alcohol infused) | 7.6 cm × 7.6 cm × 7.6 cm |
| Wet unresinified weight | 32.33 gms |
| Resinified weight | 18.99 gms |
| Resinified dimensions | 6.9 cm × 6.7 cm × 6.7 cm |
| Final weight, carbonized | 10.35 gms |
| Final dimensions | 5.2 cm × 5.5 cm × 5.4 cm |
| Product bulk density | 0.07 gm/cc |

Examples I, II and III illustrate extremely rapid carbonization of the sample without consequent cracking.

It will be obvious to those skilled in the art that the effects of any inhibitors in the furfuryl alcohol must be overcome before it is resinifiable. This can be accomplished prior to the use of the furfuryl alcohol or after its infusion into the foam polymer.

The samples of vitreous carbon in Examples I, II and III exhibited the electrical conductivity characteristic of vitreous or glassy carbon. Further it was found that these vitreous carbon foams are self-extinguishing when heated to incandescence by an open flame in air and after removal of the flame, thus suggesting their use as safe and effective building heat insulation materials.

We claim:

1. The method for forming a vitreous carbon foam which comprises:

a. infusing an unreticulated flexible polyurethane foam with substantially unresinified but resinifiable furfuryl alcohol so as to cause the foam to swell by infusion of the furfuryl alcohol;
b. removing substantially all of the non-infused furfuryl alcohol from within the cells and from the surfaces of the foam;
c. resinifying the furfuryl alcohol in the foam to form a thermoset resin wherein the infusing, removing of the excess and resinifying of the furfuryl alcohol produces a resulting weight up to about six times the weight of the foam alone;
d. carbonizing the foam under neutral, non-oxidizing or reducing gas or vacuum conditions in an oven which rapidly heats the foam to a temperature sufficient to obtain carbonization, thereby allowing crack-free carbonization to be achieved in less than about 5 hours at a rate of temperature change which causes cracking of the foam when substantial resinified furfuryl alcohol remains on the surfaces; and,
e. producing the crack-free vitreous carbon foam with a shape corresponding to the unreticulated polyurethane foam.

2. The method of forming a vitreous carbon foam which comprises:
a. infusing an unreticulated flexible polyurethane foam with substantially unresinified but resinifiable furfuryl alcohol so as to cause the foam to swell by infusion of the furfuryl alcohol;
b. removing substantially all of the non-infused furfuryl alcohol from within the cells and from the surfaces of the foam;
c. resinifying the furfuryl alcohol in the foam to form a resinified, thermoset and hardened structure wherein the infusing, excess removing and resinifying of the furfuryl alcohol produces a resulting weight up to about six times the weight of the foam alone;
d. heating the resinified hardened pretreated foam under neutral, non-oxidizing or reducing gas or vacuum conditions in an oven which rapidly heats the foam to a temperature of at least about 500° C so as to form a vitreous carbon structure, whereby crack-free carbonization is achieved in less than about 5 hours at a rate of temperature change of the structure which causes cracking of pretreated foam with non-infused thermoset furan resin coated on the surfaces; and
e. producing the crack-free carbon foam with a shape corresponding to the unreticulated polyurethane foam.

3. The method of claim 2 wherein the catalyst for resinification is oxalic acid.

4. The method for forming a vitreous carbon foam which comprises:
a. infusing a flexible unreticulated polyurethane foam with substantially unresinified furfuryl alcohol which is resinifiable in situ so as to cuase the foam to swell by infusion of the furfuryl alcohol;
b. removing substantially all of the non-infused furfuryl alcohol from within the cells and from the surfaces of the foam wherein the infusing and removing of the non-infused furfuryl alcohol would produce upon curing an infused foam weight of up to about six times the weight of the foam alone;
c. carbonizing the infused foam under neutral, non-oxidizing or reducing gas or vacuum conditions in an oven which rapidly heats the foam to a temperature sufficient to obtain carbonization, thereby allowing crack-free carbonization to be achieved in less than about five hours at a rate of temperature change which causes cracking of the foam when resinifiable furfuryl alcohol remains on the surfaces; and
d. producing the crack-free vitreous carbon foam with a shape corresponding to the unreticulated polyurethane foam.

5. The method of claim 4 wherein the infused resinifiable furfuryl alcohol is simultaneously cured during the first part of the carbonization.

* * * * *